(12) United States Patent
Luo et al.

(10) Patent No.: US 12,224,618 B2
(45) Date of Patent: Feb. 11, 2025

(54) BACKUP POWER SUPPLY CONTROL METHOD, APPARATUS, AND SYSTEM

(71) Applicant: Huawei Technologies Co., Ltd., Guangdong (CN)

(72) Inventors: Bing Luo, Dongguan (CN); Liangren Fang, Shenzhen (CN); Guoqiang Yao, Shanghai (CN); Yundong Wan, Dongguan (CN); Jinfeng Li, Hefei (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 185 days.

(21) Appl. No.: 17/651,853

(22) Filed: Feb. 21, 2022

(65) Prior Publication Data
US 2022/0181903 A1 Jun. 9, 2022

Related U.S. Application Data

(63) Continuation of application No. PCT/CN2020/101636, filed on Jul. 13, 2020.

(30) Foreign Application Priority Data

Aug. 22, 2019 (CN) .......................... 201910780185.5

(51) Int. Cl.
*H02J 9/04* (2006.01)
*H02J 7/00* (2006.01)

(52) U.S. Cl.
CPC ............ *H02J 9/04* (2013.01); *H02J 7/00032* (2020.01); *H02J 7/0048* (2020.01); *H02J 7/0063* (2013.01)

(58) Field of Classification Search
CPC ........ H02J 9/04; H02J 7/00032; H02J 7/0048; H02J 7/0063
See application file for complete search history.

(56) References Cited

U.S. PATENT DOCUMENTS 8,729,732 B2 * 5/2014 Fischer ............. H04W 52/0206
307/65
10,283,987 B1 5/2019 Wang et al.
(Continued)

FOREIGN PATENT DOCUMENTS

CN 102853871 B 7/2015
CN 105682300 A 6/2016
(Continued)

*Primary Examiner* — Carlos Amaya
(74) *Attorney, Agent, or Firm* — WOMBLE BOND DICKINSON (US) LLP

(57) ABSTRACT

This application relates to the field of communications technologies, and discloses a backup power supply control method, to obtain target power supplying duration of a battery, and determine average power consumption of a communication station (101) within a time period corresponding to the target power supplying duration. Further, a state of charge of the battery is obtained, and actual power supplying duration for the battery to supply power to the communication station (101) is determined based on the state of charge of the battery and the average power consumption. Therefore, an operation mode of a communication device in the communication station (101) may be adjusted, to reduce the average power consumption of the communication station (101) within the time period corresponding to the target power supplying duration.

16 Claims, 8 Drawing Sheets

(56) References Cited

U.S. PATENT DOCUMENTS

2006/0182262 A1* 8/2006 Goldman ............ H04M 19/08
                                                      379/323
2013/0176000 A1   7/2013 Bishop et al.

FOREIGN PATENT DOCUMENTS

| | | |
|---|---|---|
| CN | 103676817 B | 9/2016 |
| CN | 106787150 A | 5/2017 |
| CN | 107706953 A | 2/2018 |
| CN | 108258729 A | 7/2018 |
| CN | 108388335 A | 8/2018 |
| CN | 109245275 A | 1/2019 |
| CN | 109256836 A | 1/2019 |
| CN | 109831019 A | 5/2019 |
| JP | 2006160176 A | 6/2006 |

* cited by examiner

CONT.
FROM
FIG. 5A

407

The first controller re-determines, based on the communication station working in a level 1 energy saving mode, the average power consumption of the communication station within the time period corresponding to the target power supplying duration, obtains the state of charge of the battery, and re-determines, based on the state of charge of the battery and the re-determined average power consumption, the actual power supplying duration for the battery to supply power to the communication station

408

If the first controller determines that the re-determined actual power supplying duration is greater than the target power supplying duration, the first controller no longer sends the energy saving instruction to the second controller

FIG. 5B

BACKUP POWER SUPPLY CONTROL METHOD, APPARATUS, AND SYSTEM

CROSS-REFERENCE TO RELATED APPLICATIONS

This application is a continuation of International Application No. PCT/CN2020/101636, filed on Jul. 13, 2020, which claims priority to Chinese Patent Application 201910780185.5, filed on Aug. 22, 2019. The disclosures of the aforementioned applications are incorporated herein by reference in these entireties.

TECHNICAL FIELD

This application relates to the communication field, and in particular, to a backup power supply control method, apparatus, and system.

BACKGROUND

Currently, in a communication station, a communication power supply system may be used to supply power to a communication device in the communication station. Specifically, when mains power supplying is normal, the mains supplies power to the communication device in the communication station; and when mains outage occurs, a battery is used to supply power to the communication device in the communication station.

It may be understood that the quantity of electricity stored by the battery is limited. Therefore, when the mains outage occurs, if the battery needs to be used to supply power to the communication device in the communication station, power supplying duration of the battery may fail to meet a requirement. That the power supplying duration of the battery fails to meet the requirement means that the power supplying duration of the battery is less than duration of the mains outage. As a result, during the mains outage, the battery cannot supply power to the communication device in the communication station within some time periods. For example, the power supplying duration of the battery is three hours, and the duration of the mains outage is four hours. As a result, the battery cannot supply power to the communication device in the communication station for one hour. Duration in which the battery can supply power to the communication device in the communication station may also be referred to as backup power duration of the battery. In this case, the quantity of batteries may be increased to resolve the above problem. However, the increase of the quantity of the batteries may occupy a part of space in the communication station, and currently the communication station has a problem of not having plenty of space.

Therefore, how to enable the power supplying duration of the battery to meet the requirement during the mains outage is a problem that urgently needs to be resolved.

SUMMARY

Embodiments of this application provide a backup power supply control method, apparatus, and system, to resolve a problem, in a conventional technology, of how to enable power supplying duration of a battery to meet a requirement during mains outage.

According to a first aspect of the embodiments of this application, a backup power supply control method is provided. Specifically, target power supplying duration of a battery may be obtained, and the target power supplying duration may be considered as duration of mains outage, in other words, within a time period corresponding to the target power supplying duration, the battery needs to be used to supply power to a communication station. In this embodiment of this application, to enable the battery to normally supply power to the communication station within the time period corresponding to the target power supplying duration, so that the entire communication station is not in a power-off state, in this embodiment of this application, average power consumption of the communication station within the time period corresponding to the target power supplying duration may be determined. Further, a state of charge of the battery may be obtained, and actual power supplying duration for the battery to supply power to the communication station is determined based on the state of charge of the battery and the average power consumption. If the actual power supplying duration is less than the target power supplying duration, it indicates that the state of charge of the battery is not plenty and the battery cannot supply power to the communication station within the entire time period corresponding to the target power supplying duration. In this case, in this embodiment of this application, an operation mode of a communication device in the communication station may be adjusted, to reduce the average power consumption of the communication station within the time period corresponding to the target power supplying duration, so that actual power supplying duration for the battery to supply power to the communication station whose average power consumption is reduced is greater than or equal to the target power supplying duration. That is, a quantity of electricity required for supplying power to a target station within the time period corresponding to the target power supplying duration is reduced, so that the state of charge of the battery is plenty for supplying power to the communication station within the entire time period corresponding to the target power supplying duration. It can be learned that, the solutions provided in this embodiment of this application may be used to enable the actual power supplying duration of the battery to meet a requirement during the mains outage.

In one embodiment, it is considered that historical power consumption data of the communication station can reflect the operation mode of the communication device in the communication station to some extent, and the operation mode of the communication device in the communication station has correlation in terms of time. Therefore, in this embodiment of this application, average power consumption of the communication station within a mains outage time period may be determined based on the historical power consumption data of the communication station. Specifically, historical power consumption data of the communication station within a first preset historical time period may be obtained, and current power consumption of the communication station is obtained. In addition, the current power consumption of the communication station is matched with the historical power consumption data, and first power consumption corresponding to the current power consumption is determined in the historical power consumption data. Then, total power consumption of the communication station within a first historical time period is determined based on the historical power consumption data, where the first historical time period uses the first historical moment as a start moment, and has duration equal to the target power supplying duration. Finally, the average power consumption is determined based on the total power consumption and a relationship between the first power consumption and the current power consumption.

In one embodiment, the target power supplying duration may be entered by a user through a human-computer interaction interface.

In one embodiment, the foregoing target power supplying duration may alternatively be obtained through estimation according to corresponding mains outage duration estimation logic. Specifically, it is considered that in actual application, mains outage duration also has regularity. Usually, future outage duration of the mains is target outage duration, and is usually not less than average daily outage duration within a period of time before a current moment, and not greater than maximum daily outage duration within a period of time before the current moment. Therefore, in this embodiment of this application, mains outage data of the communication station within a second preset historical time period may be obtained, mains average daily outage duration of the communication station within the second preset historical time period is determined based on the mains outage data, and mains maximum daily outage duration of the communication station within the second preset historical time period is determined based on the mains outage data. Then, the target power supplying duration is determined based on the mains average daily outage duration and the mains maximum daily outage duration, where the target power supplying duration is greater than the average daily outage duration and less than the maximum daily outage duration.

In one embodiment, it is considered that in actual application, turning off the communication device in the communication station can reduce the foregoing average power consumption. Therefore, in an implementation of this embodiment of this application, the communication device in the communication station may be turned off. For example, some communication devices in the communication station, such as a temperature controlling device, may be turned off. In addition, it is considered that in actual application, power of the communication device may be adjusted, and if the power of the communication device is reduced, the foregoing average power may also be reduced. Therefore, in another implementation of this embodiment of this application, the power of the communication device may be reduced. For example, power of some communication devices may be reduced.

According to a second aspect, embodiments of this application provides a backup power supply control system. The system includes a first controller and a second controller, where the first controller is configured to: obtain target power supplying duration of a battery, and determine average power consumption of a communication station within a time period corresponding to the target power supplying duration: the first controller is further configured to: obtain a state of charge of the battery, and determine, based on the state of charge of the battery and the average power consumption, actual power supplying duration for the battery to supply power to the communication station: the first controller is further configured to: if the actual power supplying duration is less than the target power supplying duration, send an energy saving instruction to the second controller; and the second controller is configured to: adjust an operation mode of a communication device in the communication station according to the energy saving instruction, to reduce the average power consumption, where actual power supplying duration for the battery to supply power to the communication station whose average power consumption is reduced is enabled to be greater than or equal to the target power supplying duration.

In one embodiment, that the first controller determines average power consumption of a communication station within a time period corresponding to the target power supplying duration includes: the first controller obtains historical power consumption data of the communication station within a first preset historical time period, and obtains current power consumption of the communication station: the first controller matches the current power consumption of the communication station with the historical power consumption data, and determines, in the historical power consumption data, first power consumption corresponding to the current power consumption, where the first power consumption is power consumption corresponding to the communication station at a first historical moment within the first preset historical time period: the first controller determines total power consumption of the communication station within a first historical time period based on the historical power consumption data, where the first historical time period uses the first historical moment as a start moment, and has duration equal to the target power supplying duration; and the first controller determines the average power consumption based on the total power consumption and a relationship between the first power consumption and the current power consumption.

In one embodiment, that the first controller obtains target power supplying duration of a battery includes: the first controller obtains the target power supplying duration entered by a user through a human-computer interaction interface.

In one embodiment, the target power supplying duration is determined in the following manner: obtaining, by the first controller, mains outage data of the communication station within a second preset historical time period: determining, by the first controller based on the mains outage data, mains average daily outage duration of the communication station within the second preset historical time period, and determining, based on the mains outage data, mains maximum daily outage duration of the communication station within the second preset historical time period; and determining, by the first controller, the target power supplying duration based on the mains average daily outage duration and the mains maximum daily outage duration, where the target power supplying duration is greater than the average daily outage duration and less than the maximum daily outage duration.

In one embodiment, to maximize a power supplying capability of the battery, the energy saving instruction carries a target energy saving level; and that the second controller adjusts an operation mode of a communication device in the communication station according to the energy saving instruction, to reduce the average power consumption includes: the second controller determines, based on a predetermined mapping relationship between an energy saving level and an energy saving policy, a target energy saving policy corresponding to the target energy saving level; and the second controller adjusts the operation mode of the communication device in the communication station according to the target energy saving policy, to reduce the average power consumption.

In one embodiment, that the second controller adjusts an operation mode of a communication device in the communication station includes any one or any combination of the following: controlling, by the second controller, the communication device in the communication station to be turned off, or controlling, by the second controller, power of the communication device in the communication station to be reduced.

According to a third aspect, embodiments of this application provides a backup power supply control method, where the method includes: A first controller obtains target power supplying duration of a battery, and determines average power consumption of a communication station within a time period corresponding to the target power supplying duration. The first controller obtains a state of charge of the battery, and determines, based on the state of charge of the battery and the average power consumption, actual power supplying duration for the battery to supply power to the communication station. If the actual power supplying duration is less than the target power supplying duration, the first controller sends an energy saving instruction to a second controller.

In one embodiment, that the first controller obtains target power supplying duration of a battery includes: The first controller obtains the target power supplying duration entered by a user through a human-computer interaction interface.

In one embodiment, the target power supplying duration is determined in the following manner: obtaining, by the first controller, mains outage data of the communication station within a second preset historical time period: determining, by the first controller based on the mains outage data, mains average daily outage duration of the communication station within the second preset historical time period, and determining, based on the mains outage data, mains maximum daily outage duration of the communication station within the second preset historical time period; and determining, by the first controller, the target power supplying duration based on the mains average daily outage duration and the mains maximum daily outage duration, where the target power supplying duration is greater than the average daily outage duration and less than the maximum daily outage duration.

In one embodiment, the energy saving instruction carries a target energy saving level, and the target energy saving level is determined based on a difference between the target power supplying duration and the actual power supplying duration.

According to a fourth aspect, embodiments of this application provides a backup power supply control method, where the method includes: A second controller receives an energy saving instruction sent by a first controller. The second controller adjusts an operation mode of a communication device in a communication station according to the energy saving instruction, to reduce average power consumption, where actual power supplying duration for a battery to supply power to the communication station whose average power consumption is reduced is enabled to be greater than or equal to target power supplying duration, and the average power consumption is power consumption of the communication station within a time period corresponding to the target power supplying duration.

In one embodiment, the energy saving instruction carries a target energy saving level; and that the second controller adjusts an operation mode of a communication device in the communication station according to the energy saving instruction, to reduce the average power consumption includes: The second controller determines, based on a predetermined mapping relationship between an energy saving level and an energy saving policy, a target energy saving policy corresponding to the target energy saving level. The second controller adjusts the operation mode of the communication device in the communication station according to the target energy saving policy, to reduce the average power consumption.

In one embodiment, that the second controller adjusts an operation mode of a communication device in the communication station includes any one or any combination of the following: controlling, by the second controller, the communication device in the communication station to be turned off, or controlling, by the second controller, power of the communication device in the communication station to be reduced.

According to a fifth aspect, embodiments of this application provides a backup power supply control apparatus, where the apparatus includes: a first obtaining unit, configured to obtain target power supplying duration of a battery: a first determining unit, configured to determine average power consumption of a communication station within a time period corresponding to the target power supplying duration: a second obtaining unit, configured to obtain a state of charge of the battery: a second determining unit, configured to determine, based on the state of charge of the battery and the average power consumption, actual power supplying duration for the battery to supply power to the communication station; and an adjustment unit, configured to: if the actual power supplying duration is less than the target power supplying duration, adjust an operation mode of a communication device in the communication station, to reduce the average power consumption, where actual power supplying duration for the battery to supply power to the communication station whose average power consumption is reduced is enabled to be greater than or equal to the target power supplying duration.

In one embodiment, the first determining unit is specifically configured to: obtain historical power consumption data of the communication station within a first preset historical time period, and obtain current power consumption of the communication station: match the current power consumption of the communication station with the historical power consumption data, and determine, in the historical power consumption data, first power consumption corresponding to the current power consumption, where the first power consumption is power consumption corresponding to the communication station at a first historical moment within the first preset historical time period: determine total power consumption of the communication station within a first historical time period based on the historical power consumption data, where the first historical time period uses the first historical moment as a start moment, and has duration equal to the target power supplying duration; and determine the average power consumption based on the total power consumption and a relationship between the first power consumption and the current power consumption.

In one embodiment, the first obtaining unit is specifically configured to obtain the target power supplying duration entered by a user through a human-computer interaction interface. In one embodiment, the target power supplying duration is determined in the following manner: obtaining mains outage data of the communication station within a second preset historical time period: determining, based on the mains outage data, mains average daily outage duration of the communication station within the second preset historical time period, and determining, based on the mains outage data, mains maximum daily outage duration of the communication station within the second preset historical time period; and determining the target power supplying duration based on the mains average daily outage duration and the mains maximum daily outage duration, where the target power supplying duration is greater than the average daily outage duration and less than the maximum daily outage duration.

In one embodiment, the adjustment unit is specifically configured to: control the communication device in the communication station to be turned off, and/or control power of the communication device in the communication station to be reduced.

According to a sixth aspect, embodiments of this application provides a backup power supply control apparatus, where the apparatus includes: a first obtaining unit, configured to obtain target power supplying duration of a battery: a first determining unit, configured to determine average power consumption of a communication station within a time period corresponding to the target power supplying duration: a second obtaining unit, configured to obtain a state of charge of the battery: a second determining unit, configured to determine, based on the state of charge of the battery and the average power consumption, actual power supplying duration for the battery to supply power to the communication station; and a sending unit, configured to: if the actual power supplying duration is less than the target power supplying duration, send an energy saving instruction to a second controller.

In one embodiment, the first obtaining unit is specifically configured to obtain the target power supplying duration entered by a user through a human-computer interaction interface.

In one embodiment, the target power supplying duration is determined in the following manner: obtaining mains outage data of the communication station within a second preset historical time period: determining, based on the mains outage data, mains average daily outage duration of the communication station within the second preset historical time period, and determining, based on the mains outage data, mains maximum daily outage duration of the communication station within the second preset historical time period; and determining the target power supplying duration based on the mains average daily outage duration and the mains maximum daily outage duration, where the target power supplying duration is greater than the average daily outage duration and less than the maximum daily outage duration.

In one embodiment, the energy saving instruction carries a target energy saving level, and the target energy saving level is determined based on a difference between the target power supplying duration and the actual power supplying duration.

According to a seventh aspect, embodiments of this application provides a backup power supply control apparatus, where the apparatus includes: a receiving unit, configured to receive an energy saving instruction sent by a first controller; and an adjustment unit, configured to adjust an operation mode of a communication device in a communication station according to the energy saving instruction, to reduce average power consumption, where actual power supplying duration for a battery to supply power to the communication station whose average power consumption is reduced is enabled to be greater than or equal to target power supplying duration, and the average power consumption is power consumption of the communication station within a time period corresponding to the target power supplying duration.

In one embodiment, the energy saving instruction carries a target energy saving level; and the adjustment unit is specifically configured to: determine, based on a predetermined mapping relationship between an energy saving level and an energy saving policy, a target energy saving policy corresponding to the target energy saving level; and adjust the operation mode of the communication device in the communication station according to the target energy saving policy, to reduce the average power consumption.

In one embodiment, the adjusting an operation mode of a communication device in the communication station includes any one or any combination of the following: controlling the communication device in the communication station to be turned off, or controlling power of the communication device in the communication station to be reduced.

According to an eighth aspect, embodiments of this application provides a backup power supply device. The device includes a processor and a memory. The memory is configured to store instructions. The processor is configured to execute the instructions in the memory, to perform the method according to any one of the first aspect or the possible implementations of the first aspect.

According to a ninth aspect, embodiments of this application provides a backup power supply device. The device includes a processor and a memory. The memory is configured to store instructions. The processor is configured to execute the instructions in the memory, to perform the method according to any one of the third aspect or the possible implementations of the third aspect.

According to a tenth aspect, embodiments of this application provides a backup power supply device. The device includes a processor and a memory. The memory is configured to store instructions. The processor is configured to execute the instructions in the memory, to perform the method according to any one of the fourth aspect or the possible implementations of the fourth aspect.

According to an eleventh aspect, embodiments of this application provides a computer-readable storage medium, including instructions. When the instructions are run on a computer, the computer is enabled to perform the method according to any one of the first aspect or the possible implementations of the first aspect.

According to a twelfth aspect, an embodiment of this application provides a computer-readable storage medium, including instructions. When the instructions are run on a computer, the computer is enabled to perform the method according to any one of the third aspect or the possible implementations of the third aspect.

According to a thirteenth aspect, embodiments of this application provides a computer-readable storage medium, including instructions. When the instructions are run on a computer, the computer is enabled to perform the method according to any one of the fourth aspect or the possible implementations of the fourth aspect.

According to a fourteenth aspect, embodiments of this application provides a computer program product including instructions. When the computer program product is run on a computer, the computer is enabled to perform the method according to any one of the first aspect or the possible implementations of the first aspect.

According to a fifteenth aspect, embodiments of this application provides a computer program product including instructions. When the computer program product is run on a computer, the computer is enabled to perform the method according to any one of the third aspect or the possible implementations of the third aspect.

According to a sixteenth aspect, embodiments of this application provides a computer program product including instructions. When the computer program product is run on a computer, the computer is enabled to perform the method according to any one of the fourth aspect or the possible implementations of the fourth aspect.

BRIEF DESCRIPTION OF DRAWINGS

To describe the technical solutions in the embodiments of this application or in a conventional technology more clearly, the following briefly describes the accompanying drawings used in describing the embodiments or the conventional technology. It is clear that, the accompanying drawings in the following descriptions show some embodiments of this application, and a person of ordinary skill in the art may still derive another drawing from these accompanying drawings without creative efforts.

FIG. 5A and FIG. 5B are a schematic flowchart of another backup power supply control method according to an embodiment of this application:

DESCRIPTION OF EMBODIMENTS

Embodiments of this application provide a backup power supply control method, apparatus, and system, to enable actual power supplying duration of a battery to meet a requirement during mains outage.

Figure 1:
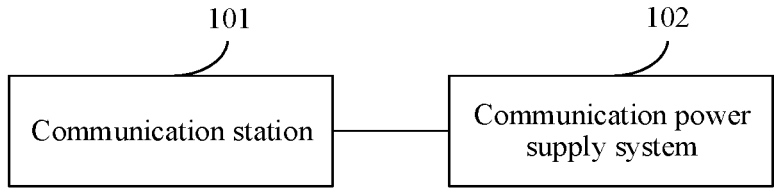
FIG. 1 is a schematic diagram of an example application scenario according to an embodiment of this application.

For ease of understanding, the following first describes an application scenario of the embodiments of this application. FIG. 1 is a schematic diagram of an example application scenario according to an embodiment of this application.

The scenario shown in FIG. 1 includes a communication station 101 and a communication power supply system 102. The communication station 101 may be, for example, a base station, and the communication power supply system 102 is configured to supply power to a communication device in the communication station 101.

It should be noted that when the communication station 101 is the base station, the communication station may include a baseband unit (BBU) and a radio frequency unit. The BBU, as a brain of the entire system, is configured to centrally manage the entire base station, provides a physical interface between the base station and a transmission network, provides communication interfaces with the radio frequency unit and the communication power supply system 102, and is responsible for controlling an operation mode of the communication device in the base station. The radio frequency unit is a radio frequency part of the base station, and mainly completes modulation and demodulation, data processing, and the like of a baseband signal and a radio frequency signal. The communication power supply system 102 may supply power to the radio frequency unit. For the radio frequency unit, carrier transmit power may be reduced by disabling a carrier frequency, a channel, or the like of the radio frequency part, to reduce power consumption of the base station.

Certainly, the base station may further include other network elements, which are not described one by one herein.

It should be noted that the communication power supply system 102 may include an energy controlling monitor, a rectifier, and a battery. The energy controlling monitor may be considered as a central processing unit of the entire communication power supply system 102, and centrally monitors working statuses of energy components such as the rectifier, the battery, and a temperature control device in the communication power supply system 102. The energy controlling monitor may collect and analyze related data of the communication power supply system 102, and may communicate with the BBU of the communication station. The rectifier is configured to transform alternating current to direct current that is usable for the communication device and the rectifier is controlled by the energy controlling monitor. The battery is used for electric energy storage. The battery is equipped with a battery management system (BMS), and is managed by the energy controlling monitor. The energy controlling monitor can monitor related data of the battery in real time through the battery BMS, such as a battery voltage, a current, a remaining capacity, a battery state of health, and other data.

Certainly, the communication power supply system 102 may further include other devices, which are not described one by one herein.

Usually, the communication power supply system 102 may supply power to the communication device in the communication station 101 by using the mains. After mains outage, the battery may be used to supply power to the communication device in the communication station 101.

Certainly, the communication power supply system may supply power to the communication station 101 in a hybrid power supplying manner. For example, the communication station 101 is powered by the mains and a solar supply. For another example, the communication station 101 is powered by the mains and a diesel generation supply. This is not specifically limited in the embodiments of this application.

In research, it is found that, in a conventional technology, when mains outage occurs, the communication station 101 may enter an energy saving running state. Specifically, the communication device in the communication station performs an energy saving action within the specified time. For example, transmit power of a radio frequency module is reduced within a T1 time period, some transmit channels are disabled within a T2 time period, and a carrier is disabled within a T3 time period. T1, T2, and T3 are determined by a user based on experience. However, in this manner, because an actual status of the battery, such as a state of charge of the battery, is not considered, this manner cannot enable the battery to supply power to the communication station during the entire mains outage. As a result, power supplying duration of the battery is less than mains outage duration. Consequently, within some time periods during the mains outage, the battery cannot supply power to the communication device in the communication station.

In addition, in research, it is further found that, in the conventional technology, during the mains outage, the communication power supply system 102 may control, based on low-load voltage disconnection and battery-load voltage disconnection of the battery by itself, some communication devices in the communication station 101 to be powered off. For example, when the low-load voltage disconnection of the battery is lower than a first voltage, for example, 44 V, some communication devices are controlled to be powered off; and when the battery-load voltage disconnection of the battery is lower than a second voltage, for example, 43.2 V, some other communication devices are controlled to be powered off. However, the communication station enters the energy saving running state (that is, some communication devices are powered off) only when the low-load voltage disconnection of the battery is lower than the first voltage, and when the low-load voltage disconnection of the battery is lower than the first voltage, the state of charge of the battery is usually small, that is, the battery may continue supplying power to the communication station 101 for a short period of time. Therefore, this manner cannot enable the battery to supply power to the communication station during the entire mains outage. As a result, the power supplying duration of the battery is less than duration of the mains outage. As a result, the power supplying duration of the battery is less than the mains outage duration. Consequently, within some time periods during the mains outage, the battery cannot supply power to the communication device in the communication station.

In view of this, embodiments of this application provides a backup power supply control method, to enable actual power supplying duration of a battery to meet a requirement in a case of mains outage. With reference to the accompanying drawings, the following describes the backup power supply control method provided in the embodiments of this application.

Figure 2:
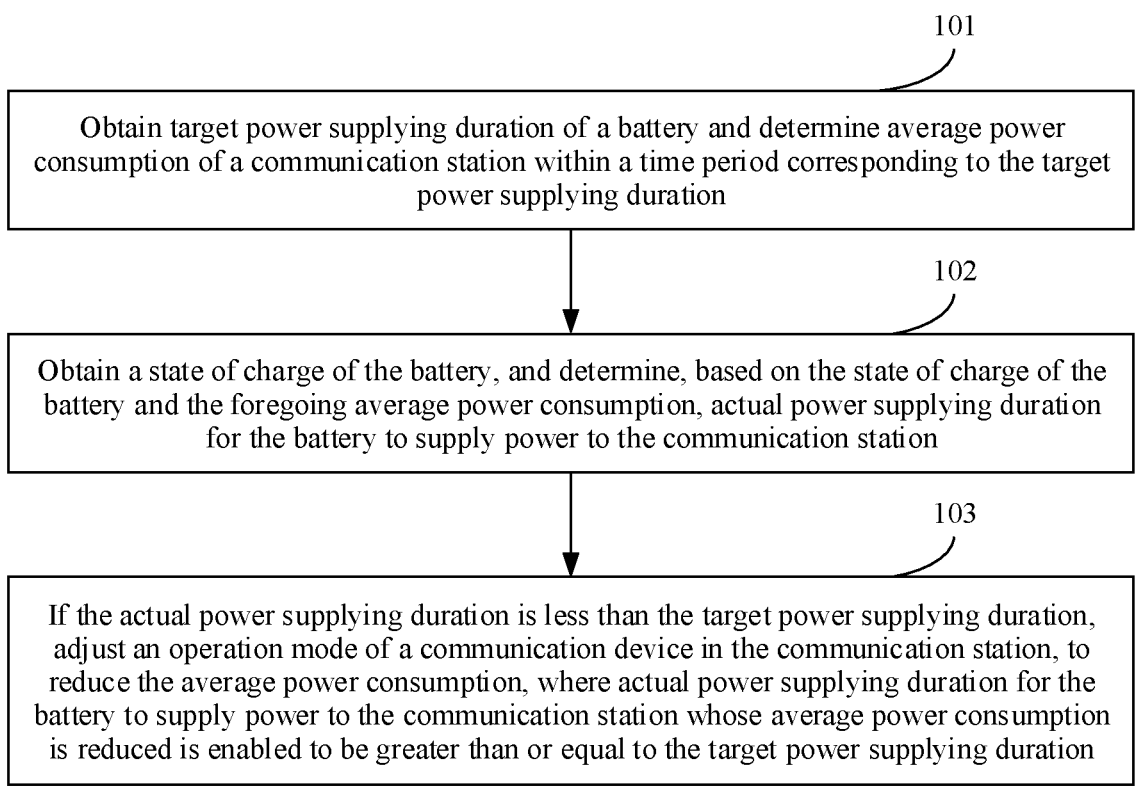
FIG. 2 is a schematic flowchart of a backup power supply control method according to an embodiment of this application.

FIG. 2 is a schematic flowchart of a backup power supply control method according to an embodiment of this application. The backup power supply control method shown in FIG. 2 may be implemented, for example, by using the following operations 101 to 103.

It should be noted that the backup power supply control method shown in FIG. 2 may be performed by a controller of a communication station 101 shown in FIG. 1, or may be performed by a controller of a communication power supply system 102. This is not specifically limited in this embodiment of this application. In the following descriptions of this embodiment of this application, the controller of the communication power supply system 102 is referred to as a first controller, and the first controller may be, for example, the foregoing energy controlling monitor. The controller of the communication station 101 is referred to as a second controller, and the second controller may be, for example, the foregoing BBU. It should be noted that an occasion for performing the method shown in FIG. 2 is not specifically limited in this embodiment of this application. For example, the method shown in FIG. 2 may be performed after the first controller detects mains outage. Certainly, it is considered that in actual application, in some cases, a related department delivers a mains outage notification before the mains outage. In this case, the method shown in FIG. 2 may also be performed at a moment before the mains outage is about to occur.

Operation 101: Obtain target power supplying duration of a battery, and determine average power consumption of a communication station within a time period corresponding to the target power supplying duration.

It should be noted that the target power supplying duration mentioned herein may be considered as mains outage duration. In other words, within the time period corresponding to the target power supplying duration, the battery needs to be used to supply power to the communication station. The battery mentioned herein may be a lithium battery, or may be a lead acid battery. This is not specifically limited in this embodiment of this application.

For ease of description, in the following descriptions implemented in this application, the "time period corresponding to the target power supplying duration" is referred to as a "mains outage time period". It may be understood that, to some extent, the average power consumption may be reflected in a quantity of electricity required for supplying power to the communication station within the mains outage time period.

A specific implementation of "obtaining target power supplying duration of a battery." in operation 101 is not specifically limited in this embodiment of this application. In an example, the target power supplying duration may be entered by a user through a human-computer interaction interface. For example, the related department delivers the mains outage notification, and the notification specifies the mains outage duration. In this case, the user may enter the target power supplying duration through the human-computer interaction interface. For another example, the user estimates mains outage duration, and enters, through the human-computer interaction interface, the target power supplying duration estimated by the user. For still another example, the first controller or the second controller may estimate the target power supplying duration according to related mains outage duration estimation logic. It should be noted that the terminal device mentioned herein usually refers to a terminal device on a communication power supply system side.

It should be noted that, if the method shown in FIG. 2 is implemented by the first controller, the first controller may directly obtain the target supply powering duration entered by the user on the terminal device through the human-computer interaction interface. If the method shown in FIG. 2 is performed by the second controller, after obtaining the target power supplying duration, the first controller may send the target power supplying duration to the second controller, that is, the second controller may obtain the target power supplying duration from the first controller.

A specific implementation of "determining average power consumption of a communication station within a time period corresponding to the target power supplying duration" in operation 101 is not specifically limited in this embodiment of this application. As an example, it is considered that historical power consumption data of the communication station can reflect an operation mode of a communication device in the communication station to some extent, and the operation mode of the communication device in the communication station has correlation in terms of time. Therefore, in this embodiment of this application, average power consumption of the communication station within the mains outage time period may be determined based on the historical power consumption data of the communication station.

It is considered that, in actual application, the first controller collects statistics on power consumption data of the communication station at a specific time interval. Therefore, if the method shown in FIG. 2 is implemented by the first controller, the first controller may directly obtain the historical power consumption data that is of the communication station and on which the first controller collects statistics. If the method shown in FIG. 2 is implemented by the second controller, the second controller may obtain the historical power consumption data of the communication station from the first controller, and determine, based on the historical power consumption data, the average power consumption of the communication station within the mains outage time period.

Operation 102: Obtain a state of charge of the battery, and determine, based on the state of charge of the battery and the foregoing average power consumption, actual power supplying duration for the battery to supply power to the communication station.

In this embodiment of this application, the first controller may obtain the state of charge of the battery by using a BMS of the battery. Certainly, if the method shown in FIG. 2 is performed by the second controller, the first controller may send the state of charge to the second controller.

It may be understood that after the state of charge of the battery is determined, the actual power supplying duration for the battery to supply power to the communication station may be determined based on the state of charge of the battery and the foregoing average power consumption. The state of charge of the battery may be determined based on a state of charge (SOC) percentage of the battery and a nominal capacity of the battery. For example, if the state of charge of the battery is C, the average power consumption is P, and a voltage of the battery is V, the actual power supplying duration for the battery to supply power to the communication station is $T=C/(P/V)$, where $C=C1*c2$, $C1$ is the nominal capacity of the battery, and $c2$ is the state of charge percentage of the battery.

It may be understood that, in actual application, the state of charge of the battery is related to a state of health of the battery. After the battery is used for a period of time, a quantity of actual available electricity of the battery is usually less than the nominal capacity of the battery. Therefore, when the state of charge of the battery is determined, the state of health (SOH) of the battery may be further considered. For example, if the state of health of the battery is K, $C=C1*c2*K$.

Operation 103: If the actual power supplying duration is less than the target power supplying duration, adjust the operation mode of the communication device in the communication station, to reduce the average power consumption, where actual power supplying duration for the battery to supply power to the communication station, whose average power consumption is reduced, is enabled to be greater than or equal to the target power supplying duration.

It may be understood that if the actual power supplying duration is less than the target power supplying duration, it indicates that the state of charge of the battery is not plenty and the battery cannot supply power to the communication station within the entire mains outage time period. In this case, the operation mode of the communication device in the communication station may be adjusted, to reduce the average power consumption, so that the actual power supplying duration for the battery to supply power to the communication station, whose average power consumption is reduced, is greater than or equal to the target power supplying duration.

A specific implementation of adjusting the operation mode of the communication device in the communication station is not specifically limited in this embodiment of this application. It is considered that in actual application, turning off the communication device in the communication station can reduce the foregoing average power consumption. Therefore, in an implementation of this embodiment of this application, the communication device in the communication station may be turned off. For example, some communication devices in the communication station, such as a temperature controlling device, may be turned off. In addition, it is considered that in actual application, power of the communication device may be adjusted, and if the power of the communication device is reduced, the foregoing average power may also be reduced. Therefore, in another implementation of this embodiment of this application, the power of the communication device may be reduced. For example, power of some communication devices may be reduced. In this embodiment of this application, the power of some communication devices may be reduced in a manner such as disabling a carrier frequency or reducing a pilot.

It should be noted that, in this embodiment of this application, because the second controller may be considered as a control center of the communication station, if the method shown in FIG. 2 is performed by the second controller, the second controller may directly adjust the operation mode of the communication device in the communication station. If the method shown in FIG. 2 is implemented by the first controller, the first controller may indirectly adjust the operation mode of the communication device in the communication station. For example, the first controller may send an energy saving instruction to the second controller. The second controller may adjust the operation mode of the communication device in the communication station according to the energy saving instruction.

In this embodiment of this application, after the operation mode of the communication device in the communication station is adjusted, the foregoing operations 101 to 103 may be repeatedly performed, that is, average power consumption of the communication station after the operation mode adjustment within the mains outage time period is re-determined. Corresponding actual power supplying duration is re-determined based on the state of charge of the battery and the re-determined average power consumption, until the determined actual power supplying duration is greater than or equal to the target power supplying duration. In a process of repeatedly performing the foregoing operation 103, the operation mode of the communication device in the communication station may be adjusted in a gradient adjustment manner, that is, an energy saving level of the communication station is gradually increased, to fully utilize a power supplying capability of the battery.

It can be learned from the foregoing descriptions that, the solution provided in this embodiment of this application may be used to enable the actual power supplying duration of the battery to meet a requirement during the mains outage.

As described above, the average power consumption of the communication station within the mains outage time period may be determined based on the historical power consumption data of the communication station. The following describes, with reference to the accompanying drawings, a specific implementation of determining the average power consumption of the communication station within the mains outage time period.

Figure 3:
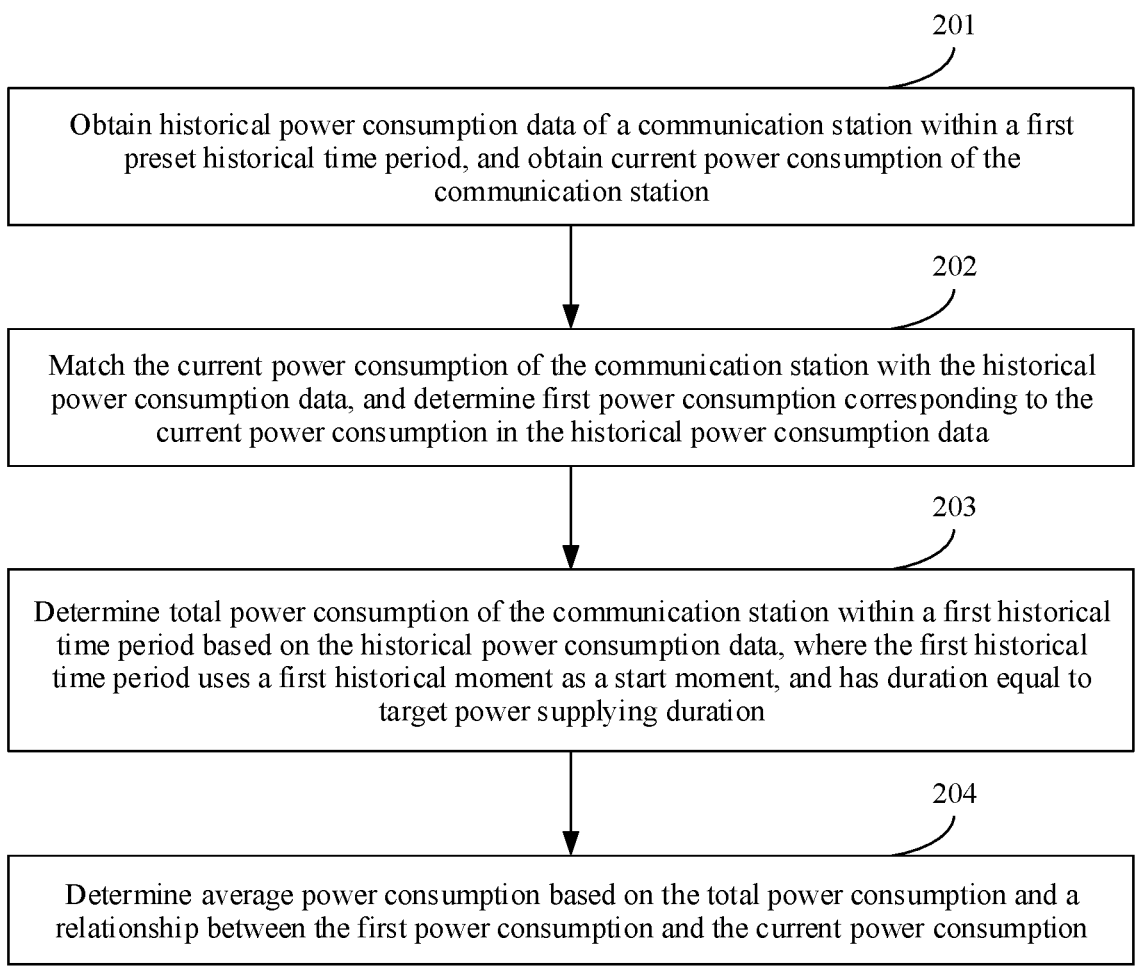
FIG. 3 is a schematic flowchart of a method for determining average power consumption of a communication station within a mains outage time period according to an embodiment of this application.

FIG. 3 is a schematic flowchart of a method for determining average power consumption of a communication station within a mains outage time period according to an embodiment of this application. The method shown in FIG. 3 may be implemented, for example, by using the following operations 201 to 204.

Operation 201: Obtain historical power consumption data of the communication station within a first preset historical time period, and obtain current power consumption of the communication station.

The first preset historical time period is not specifically limited in this embodiment of this application. For example, the first preset historical time period may be a week before a current moment, or may be a half month before the current moment. The current power consumption mentioned in this embodiment of this application is power consumption of the communication station at an execution moment of the method shown in FIG. 2. In other words, the current power consumption may be power consumption of the communication station at a moment when a first controller detects mains outage, or may be power consumption of the communication station at a moment before the mains outage is about to occur. This is not specifically limited in this embodiment of this application. As described above, the first controller collects statistics on power consumption data of the communication station at a specific time interval. Therefore, the first controller may directly obtain, from the power consumption data that is of the communication station and on which the first controller collects statistics, the historical power consumption data of the communication station within the first preset historical time period. Correspondingly, if the operations shown in FIG. 3 are performed by a second controller, the first controller may send the historical power consumption data of the communication station within the first preset historical time period to the second controller.

Operation 202: Match the current power consumption of the communication station with the historical power consumption data, and determine first power consumption corresponding to the current power consumption in the historical power consumption data.

In this embodiment of this application, the current power consumption of the communication station is matched with the historical power consumption data. For example, first power consumption whose difference from the current power consumption is the smallest may be determined in the historical power consumption data. The first power consumption is power consumption corresponding to the communication station at a first historical moment within the first preset time period.

Operation 203: Determine total power consumption of the communication station within a first historical time period based on the historical power consumption data, where the first historical time period uses the first historical moment as a start moment, and has duration equal to target power supplying duration.

Operation 204: Determine the average power consumption based on the total power consumption and a relationship between the first power consumption and the current power consumption.

It should be noted that, in actual application, power consumption of the communication station has regularity. For example, from Monday to Friday, power consumption data of the communication station has regularity. From 10 o'clock in the evening every day to 1 o'clock of the next day, the power consumption data of the communication station has regularity. In view of this, in this embodiment of this application, after the first power consumption that matches the current power consumption is determined, total power consumption of the communication station within the mains outage time period may be determined based on the total power consumption of the communication station within the first historical time period. The first historical time period uses the first historical moment as the start moment, and has the duration equal to the target power supplying duration. For example, if the target power supplying duration is three hours, and the first power consumption that matches the current power consumption is power consumption corresponding to the communication station at 12 o'clock at noon last Wednesday, the total power consumption of the communication station within the mains outage time period may be determined based on total power consumption of the communication station from 12 o'clock at noon last Wednesday to 3 o'clock in the afternoon last Wednesday.

In this embodiment of this application, considering that there may be a difference between the first power consumption and the current power consumption, the relationship between the first power consumption and the current power consumption may be further considered when the average power consumption is determined. For example, the total power consumption of the communication station within the first historical time period may be corrected by further considering the difference between the first power consumption and the current power consumption, and the corrected total power consumption is determined as the total power consumption of the communication station within the mains outage time period, so as to further determine the average power consumption of the communication station within the mains outage time period based on the total power consumption of the communication station within the first historical time period and the foregoing target power supplying duration.

As described above, the first controller or the second controller may estimate the target power supplying duration according to the related mains outage duration estimation logic. The following describes a possible implementation of determining the target power supplying duration with reference to FIG. 4.

Figure 4:
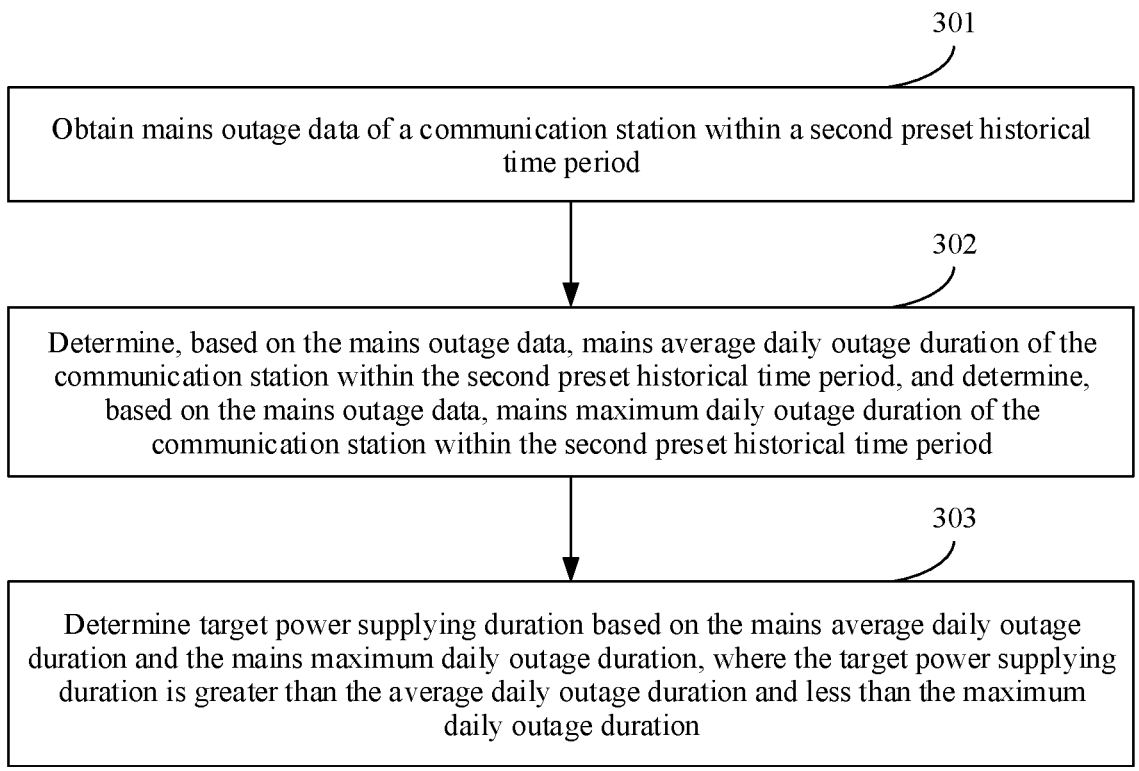
FIG. 4 is a schematic flowchart of a method for determining target power supplying duration according to an embodiment of this application.

FIG. 4 is a schematic flowchart of a method for determining target power supplying duration according to an embodiment of this application. The method shown in FIG. 4 may be implemented, for example, by using the following operations 301 to 303.

Operation 301: Obtain mains outage data of a communication station within a second preset historical time period.

It should be noted that when mains outage occurs, a first controller may record a mains outage moment. Correspondingly, when the mains restores power supplying, the first controller may record a corresponding mains power supplying restoration moment. Therefore, in this embodiment of this application, the first controller may obtain the mains outage data of the communication station within the second preset historical time period based on mains outage data stored in the first controller. A second controller may obtain the mains outage data of the communication station within the second preset historical time period by using the first controller.

The second preset historical time period is not specifically limited in this embodiment of this application. For example, the second preset historical time period may be one month before a current moment, or may be two months before the current moment.

Operation 302: Determine, based on the mains outage data, mains average daily outage duration of the communication station within the second preset historical time period, and determine, based on the mains outage data, mains maximum daily outage duration of the communication station within the second preset historical time period.

Operation 303: Determine the target power supplying duration based on the mains average daily outage duration and the mains maximum daily outage duration, where the target power supplying duration is greater than the average daily outage duration and less than the maximum daily outage duration.

It is considered that in actual application, mains outage duration also has regularity. Usually, future outage duration of the mains is target outage duration, and is usually not less than average daily outage duration within a period of time before a current moment, and not greater than maximum daily outage duration within a period of time before the current moment. Therefore, after the mains outage data of the communication station within the second preset historical time period is obtained, the mains average daily outage duration of the communication station within the second preset historical time period may be determined based on the mains outage data, and the mains maximum daily outage duration of the communication station within the second preset historical time period is determined based on the mains outage data. Then, duration between the average daily outage duration and the maximum daily outage duration is determined as the target power supplying duration.

As described above, a user may estimate the mains outage duration, and enters, through a human-computer interaction interface, the target power supplying duration estimated by the user. In this embodiment of this application, the first controller and the second controller may further perform operations 301 to 303, and control a terminal device to display the target power supplying duration obtained by performing operations 301 to 303, to assist the user in estimating the mains outage duration.

As described above, if the method shown in FIG. 2 is implemented by the first controller, the first controller may indirectly adjust an operation mode of a communication device in the communication station. For example, the first controller may send an energy saving instruction to the second controller. The second controller may adjust the operation mode of the communication device in the communication station according to the energy saving instruction.

The following describes a specific implementation in which the second controller adjusts the operation mode of the communication device in the communication station according to the energy saving instruction.

It should be noted that the foregoing energy saving instruction is not specifically limited in this embodiment of this application. The energy saving instruction is used to instruct the second controller to control the communication station to work in an energy saving mode. In an implementation of this embodiment of this application, the energy saving instruction may carry a corresponding energy saving parameter, and the energy saving parameter is an energy saving parameter corresponding to an energy saving policy. After receiving the energy saving instruction, the second controller may adjust an operation mode of a corresponding communication device based on the energy saving parameter, for example, turn off a temperature controlling device or reduce a pilot.

In another implementation of this embodiment of this application, to enable a structure of the energy saving instruction to be relatively simple, and also reduce workload of parsing the energy saving instruction by the second controller, the energy saving instruction may carry a target energy saving level. The target energy saving level may be determined based on a difference that is between actual power supplying duration and the target power supplying duration and that is calculated in operation 102. A smaller difference that is between the actual power supplying duration and the target power supplying duration and that is calculated in operation 102 indicates a lower corresponding target energy saving level, and a lower target energy saving level indicates a smaller energy saving gain of the communication device in the communication station. A larger difference that is between the actual power supplying duration and the target power supplying duration and that is calculated in operation 102 indicates a higher corresponding target energy saving level, and a higher target energy saving level indicates a larger energy saving gain of the communication device in the communication station.

The second controller may pre-establish a mapping relationship between an energy saving level and an energy saving policy, and after receiving the energy saving instruction, the second controller may parse the energy saving instruction to obtain the target energy saving level carried in the energy saving instruction, and determine, based on the predetermined mapping relationship between an energy saving level and an energy saving policy, a target energy saving policy corresponding to the target energy saving level. Then, the second controller may adjust the operation mode of the communication device in the communication station according to the determined target energy saving policy, to reduce average power consumption of the communication station within a mains outage time period.

The mapping relationship between an energy saving level and an energy saving policy may be determined based on an actual situation. This is not specifically limited in this embodiment of this application. For ease of understanding, the following uses Table 1 as an example for description.

TABLE 1

| Energy saving level | Energy saving policy |
| --- | --- |
| L1 | Reduce the pilot and limit available service power. |
| L2 | Turn off the temperature controlling device and limit the available service power. |
| L3 | Turn off the temperature controlling device and disable a carrier frequency. |

It should be noted that Table 1 is merely shown for ease of understanding, and does not constitute a limitation on this embodiment of this application. The energy saving level mentioned in this embodiment of this application is not limited to the three types shown in Table 1, and the corresponding energy saving policy is not limited to those shown in Table 1. In addition, considering that currently the communication station may provide services corresponding to 2G, 3G, 4G, and even 5G, in this embodiment of this application, for different energy saving levels, the services corresponding to 2G, 3G, 4G, and 5G may respectively have corresponding energy saving policies. Enumeration is not performed for description herein.

The foregoing describes a backup power supply control method provided in the embodiments of this application. The following describes the backup power supply control method provided in the embodiments of this application with reference to a specific scenario. In this scenario, it is considered that in actual application, the first controller collects statistics on power consumption data of the communication station at a specific time interval, and the first controller may also obtain related data of a battery by using a BMS system of the battery, for example, a state of charge percentage of the battery and a state of health of the battery. The second controller may directly control the operation mode of the communication device of the communication station. Therefore, in the embodiments of this application, to reduce data exchange between the first controller and the second controller as much as possible, so as to reduce costs of interface reconstruction between the first controller and the second controller, operation 101 and operation 102 in the backup power supply control method shown in FIG. 2 are performed by the first controller. Adjusting the operation mode of the communication device in the communication station in operation 103 is performed by the second controller.

Figure 5A:
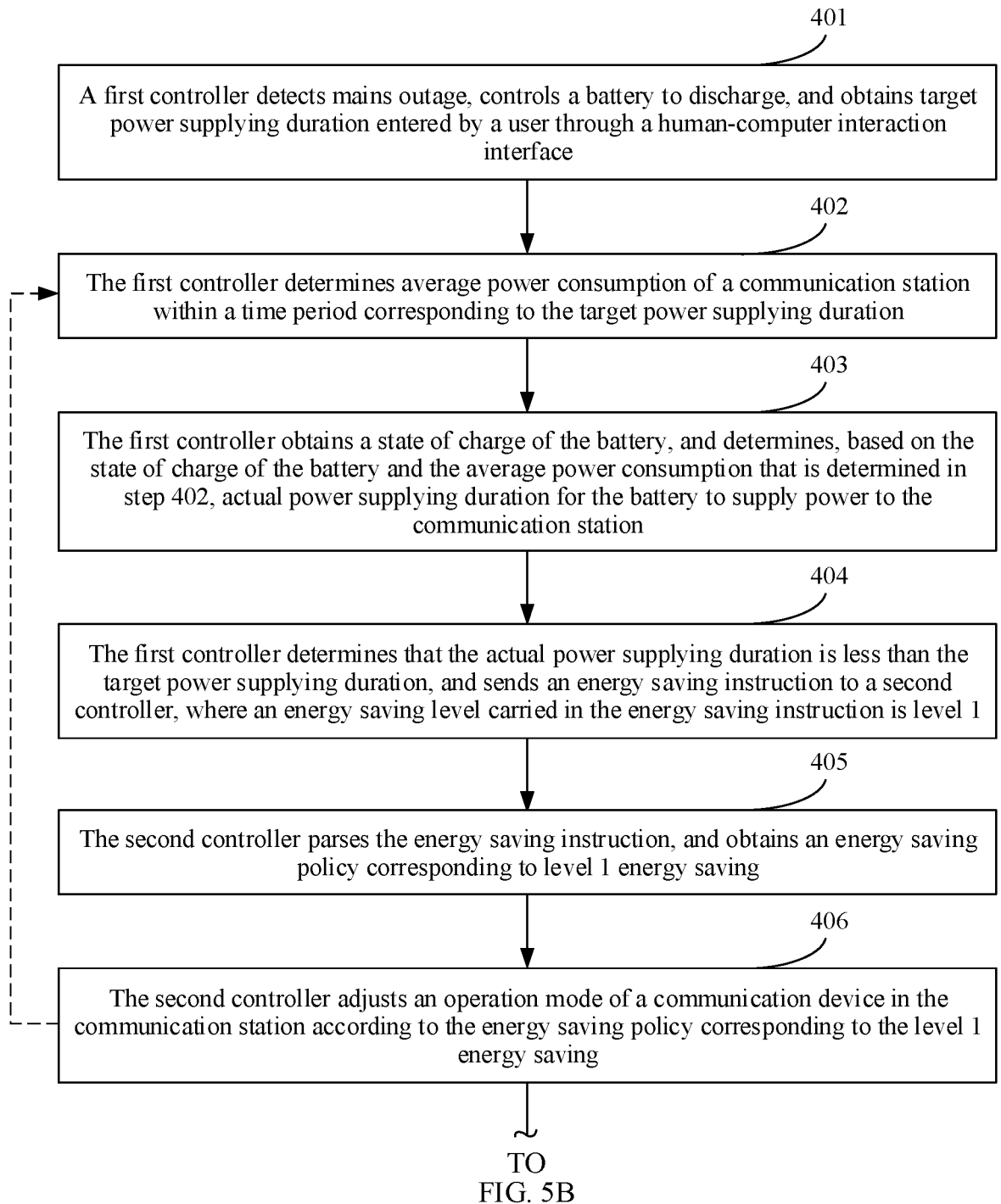

FIG. 5A and FIG. 5B are a schematic flowchart of another backup power supply control method according to an embodiment of this application. The backup power supply control method shown in FIG. 5A and FIG. 5B may be implemented, for example, by using the following operations 401 to 408.

Operation 401: A first controller detects mains outage, controls a battery to discharge, and obtains target power supplying duration entered by a user through a human-computer interaction interface.

Operation 402: The first controller determines average power consumption of a communication station within a time period corresponding to the target power supplying duration.

Operation 403: The first controller obtains a state of charge of the battery, and determines, based on the state of charge of the battery and the average power consumption that is determined in operation 402, actual power supplying duration for the battery to supply power to the communication station.

Operation 404: The first controller determines that the actual power supplying duration is less than the target power supplying duration, and sends an energy saving instruction to a second controller, where an energy saving level carried in the energy saving instruction is level 1.

It may be understood that if the first controller determines that the actual power supplying duration is greater than or equal to the target power supplying duration, the first controller may not send the energy saving instruction to the second controller, so that the communication station works in a current operation mode. Certainly, the first controller may also send an energy saving instruction carrying an energy saving level of level 0 to the second controller, to instruct the second controller not to adjust an operation mode of a communication device in the communication station.

Operation 405: The second controller parses the energy saving instruction, and obtains an energy saving policy corresponding to level 1 energy saving.

The level 1 energy saving mentioned herein means that the energy saving level is level 1.

Operation 406: The second controller adjusts the operation mode of the communication device in the communication station according to the energy saving policy corresponding to the level 1 energy saving.

After the second controller performs operation 406, the first controller performs operations 402 and 403 again based on the communication station working in a level 1 energy saving mode. The working in the level 1 energy saving mode is an operation mode in which the communication device in the communication station works after the second controller adjusts the operation mode of the communication device in the communication station according to the energy saving policy corresponding to the level 1 energy saving.

Operation 407: The first controller re-determines, based on the communication station working in the level 1 energy saving mode, the average power consumption of the communication station within the time period corresponding to the target power supplying duration, obtains the state of charge of the battery, and re-determines, based on the state of charge of the battery and the re-determined average power consumption, the actual power supplying duration for the battery to supply power to the communication station.

Operation 408: If the first controller determines that the re-determined actual power supplying duration is greater than the target power supplying duration, the first controller no longer sends the energy saving instruction to the second controller.

It may be understood that, if the second controller does not receive the energy saving instruction from the first controller again, the second controller controls the communication device in the communication station to work in the level 1 energy saving mode. Certainly, the first controller may alternatively send, to the second controller, an energy saving instruction carrying the energy saving level that is still level 1. After receiving the energy saving instruction, the second controller determines that a current energy saving level is equal to the energy saving level carried in the energy saving instruction, and then no longer adjusts the operation mode of the communication device in the communication station.

It should be noted that, if the first controller determines that the re-determined actual power supplying duration is less than the target power supplying duration, the first controller may send an energy saving instruction to the second controller, where an energy saving level carried in the energy saving instruction is higher than level 1. For example, the energy saving level carried in the energy saving instruction is level 2. After receiving the energy saving instruction, the second controller may adjust the operation mode of the communication device in the communication station according to the energy saving policy corresponding to the level 1 energy saving. Correspondingly, the first controller may re-determine, based on the communication station working in a level 2 energy saving mode, the average power consumption of the communication station within the time period corresponding to the target power supplying duration, obtain the state of charge of the battery, and re-determine, based on the state of charge of the battery and the re-determined average power consumption, the actual power supplying duration for the battery to supply power to the communication station. If the re-determined actual power supplying duration is still less than the target power supplying duration, the corresponding energy saving level may be further increased until re-determined actual power supplying duration is greater than the target power supplying duration.

Based on the backup power supply control methods provided in the foregoing embodiments, an embodiment of this application further provides a backup power supply control apparatus. The following describes the backup power supply control apparatus with reference to the accompanying drawings.

Figure 6:
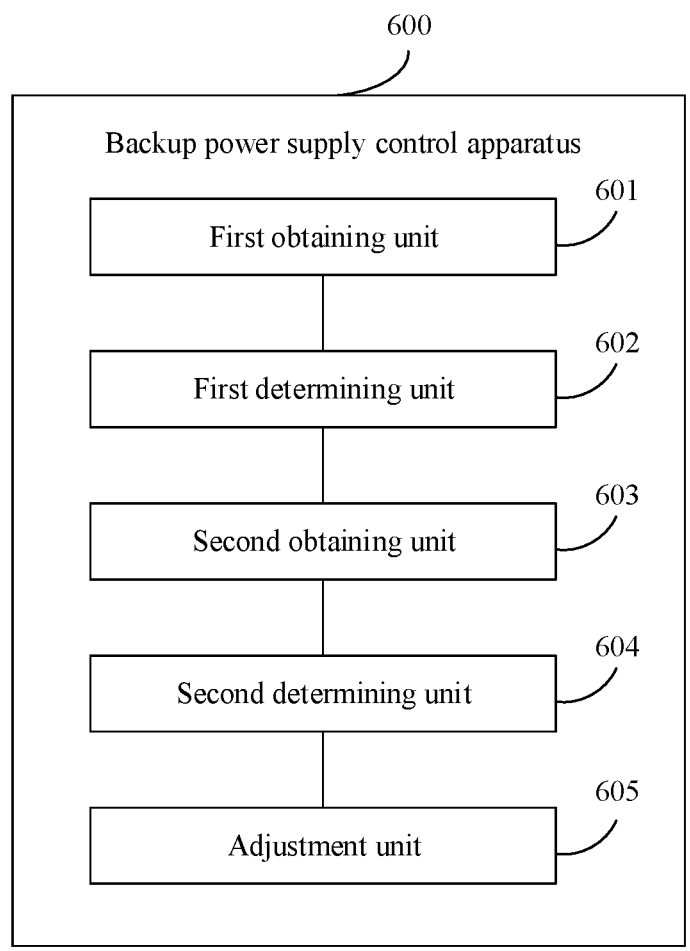
FIG. 6 is a schematic diagram of a structure of a backup power supply control apparatus according to an embodiment of this application.

FIG. 6 is a schematic diagram of a structure of a backup power supply control apparatus 600 according to an embodiment of this application. The backup power supply control apparatus 600 shown in FIG. 6 may include, for example, a first obtaining unit 601, a first determining unit 602, a second obtaining unit 603, a second determining unit 604, and an adjustment unit 605.

The first obtaining unit 601 is configured to obtain target power supplying duration of a battery.

The first determining unit 602 is configured to determine average power consumption of a communication station within a time period corresponding to the target power supplying duration.

The second obtaining unit 603 is configured to obtain a state of charge of the battery.

The second determining unit 604 is configured to determine, based on the state of charge of the battery and the average power consumption, actual power supplying duration for the battery to supply power to the communication station.

The adjustment unit 605 is configured to: if the actual power supplying duration is less than the target power supplying duration, adjust an operation mode of a communication device in the communication station, to reduce the average power consumption, where actual power supplying duration for the battery to supply power to the communication station whose average power consumption is reduced is enabled to be greater than or equal to the target power supplying duration.

In one embodiment, the first determining unit 602 is specifically configured to:
obtain historical power consumption data of the communication station within a first preset historical time period, and obtain current power consumption of the communication station;
match the current power consumption of the communication station with the historical power consumption data, and determine, in the historical power consumption data, first power consumption corresponding to the current power consumption, where the first power consumption is power consumption corresponding to the communication station at a first historical moment within the first preset historical time period;
determine total power consumption of the communication station within a first historical time period based on the historical power consumption data, where the first historical time period uses the first historical moment as a start moment, and has duration equal to the target power supplying duration; and
determine the average power consumption based on the total power consumption and a relationship between the first power consumption and the current power consumption.

In one embodiment, the first obtaining unit 601 is specifically configured to:
obtain the target power supplying duration entered by a user through a human-computer interaction interface.

In one embodiment, the target power supplying duration is determined in the following manner:
obtaining mains outage data of the communication station within a second preset historical time period;
determining, based on the mains outage data, mains average daily outage duration of the communication station within the second preset historical time period, and determining, based on the mains outage data, mains maximum daily outage duration of the communication station within the second preset historical time period; and
determining the target power supplying duration based on the mains average daily outage duration and the mains maximum daily outage duration, where the target power supplying duration is greater than the average daily outage duration and less than the maximum daily outage duration.

In one embodiment, the adjustment unit 605 is specifically configured to:
control the communication device in the communication station to be turned off, and/or control power of the communication device in the communication station to be reduced.

Specific implementation of each unit of the backup power supply control apparatus 600 has a same concept as that of the backup power supply control method shown in FIG. 2. Therefore, for the specific implementation of each unit of the backup power supply control apparatus 600, refer to the description part about the backup power supply control method shown in FIG. 2 in the foregoing embodiments. Details are not described herein again.

Figure 7:
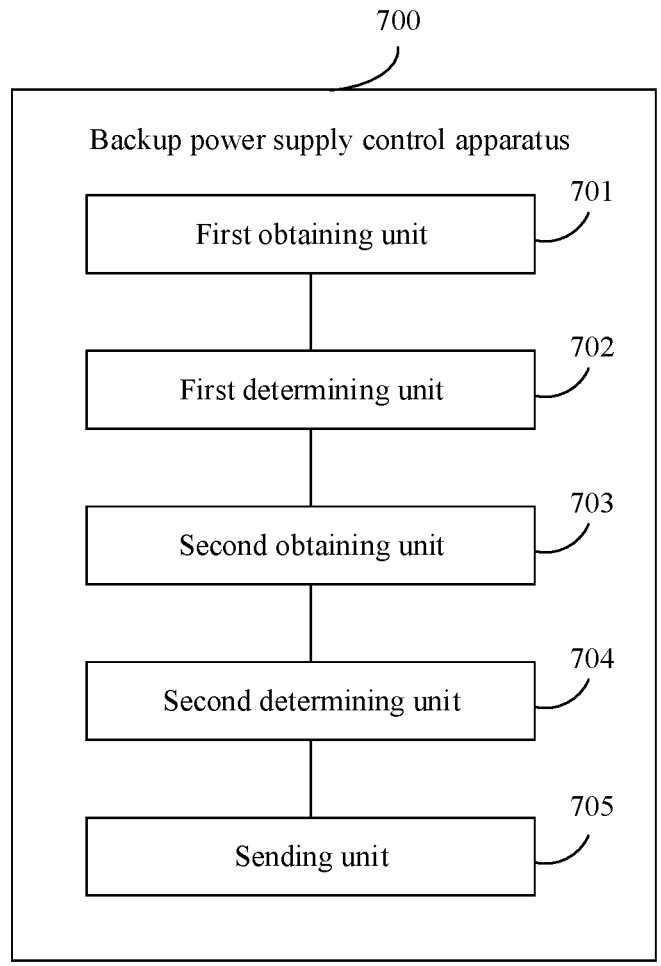
FIG. 7 is a schematic diagram of a structure of another backup power supply control apparatus according to an embodiment of this application.

FIG. 7 is a schematic diagram of a structure of another backup power supply control apparatus 700 according to an embodiment of this application. The backup power supply control apparatus 700 shown in FIG. 7 may include, for example, a first obtaining unit 701, a first determining unit 702, a second obtaining unit 703, a second determining unit 704, and a sending unit 705.

The first obtaining unit 701 is configured to obtain target power supplying duration of a battery.

The first determining unit 702 is configured to determine average power consumption of a communication station within a time period corresponding to the target power supplying duration.

The second obtaining unit 703 is configured to obtain a state of charge of the battery.

The second determining unit 704 is configured to determine, based on the state of charge of the battery and the average power consumption, actual power supplying duration for the battery to supply power to the communication station.

The sending unit 705 is configured to: if the actual power supplying duration is less than the target power supplying duration, send an energy saving instruction to a second controller.

In one embodiment, the first obtaining unit 701 is specifically configured to:
obtain the target power supplying duration entered by a user through a human-computer interaction interface.

In one embodiment, the target power supplying duration is determined in the following manner:
obtaining mains outage data of the communication station within a second preset historical time period;
determining, based on the mains outage data, mains average daily outage duration of the communication station within the second preset historical time period, and determining, based on the mains outage data, mains maximum daily outage duration of the communication station within the second preset historical time period; and
determining the target power supplying duration based on the mains average daily outage duration and the mains maximum daily outage duration, where the target power supplying duration is greater than the average daily outage duration and less than the maximum daily outage duration.

In one embodiment, the energy saving instruction carries a target energy saving level, and the target energy saving level is determined based on a difference between the target power supplying duration and the actual power supplying duration.

It should be noted that the backup power supply control apparatus 700 shown in FIG. 7 is a backup power supply control apparatus corresponding to a first controller. Therefore, for specific implementation of each unit of the backup power supply control apparatus 700, refer to the description part of the operations performed by the first controller in the foregoing embodiments. Details are not described herein again.

Figure 8:
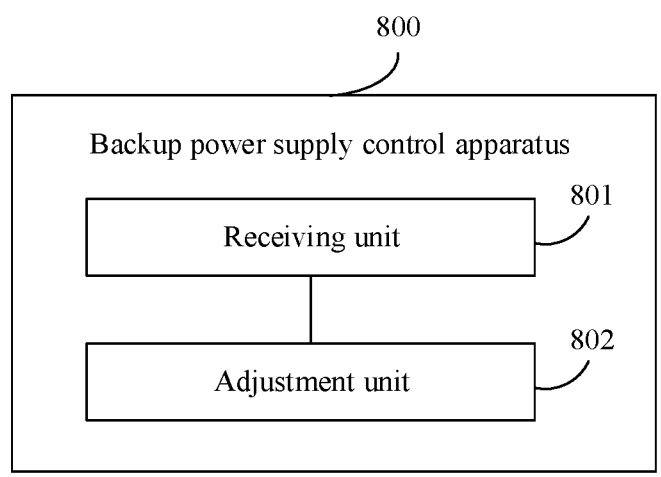
FIG. 8 is a schematic diagram of a structure of another backup power supply control apparatus according to an embodiment of this application.

FIG. 8 is a schematic diagram of a structure of another backup power supply control apparatus 800 according to an embodiment of this application. The backup power supply control apparatus 800 shown in FIG. 8 may specifically include, for example, a receiving unit 801 and an adjustment unit 802.

The receiving unit 801 is configured to receive an energy saving instruction sent by a first controller.

The adjustment unit 802 is configured to adjust an operation mode of a communication device in a communication station according to the energy saving instruction, to reduce average power consumption, where actual power supplying duration for a battery to supply power to the communication station whose average power consumption is reduced is enabled to be greater than or equal to target power supplying duration, and the average power consumption is power consumption of the communication station within a time period corresponding to the target power supplying duration.

In one embodiment, the energy saving instruction carries a target energy saving level; and
    the adjustment unit 802 is specifically configured to:
    determine, based on a predetermined mapping relationship between an energy saving level and an energy saving policy, a target energy saving policy corresponding to the target energy saving level; and
    adjust the operation mode of the communication device in the communication station according to the target energy saving policy, to reduce the average power consumption.

In one embodiment, the adjusting an operation mode of a communication device in the communication station includes any one or any combination of the following:
    controlling the communication device in the communication station to be turned off, or controlling power of the communication device in the communication station to be reduced.

It should be noted that the backup power supply control apparatus 800 shown in FIG. 8 is a backup power supply control apparatus corresponding to a second controller. Therefore, for specific implementation of each unit of the backup power supply control apparatus 800, refer to the description part of the operations performed by the second controller in the foregoing embodiments. Details are not described herein again.

An embodiment of this application further provides a backup power supply control device corresponding to the backup power supply control apparatus 600. The device includes a processor and a memory.
    The memory is configured to store instructions; and
    the processor is configured to: execute the instructions in the memory, and perform the backup power supply control method corresponding to the backup power supply control apparatus 600 in the foregoing method embodiments.

An embodiment of this application further provides a backup power supply control device corresponding to the backup power supply control apparatus 700. The device includes a processor and a memory.
    The memory is configured to store instructions; and
    the processor is configured to: execute the instructions in the memory, and perform the backup power supply control method corresponding to the backup power supply control apparatus 700 in the foregoing method embodiments.

An embodiment of this application further provides a backup power supply control device corresponding to the backup power supply control apparatus 800. The device includes a processor and a memory.
    The memory is configured to store instructions; and
    the processor is configured to: execute the instructions in the memory, and perform the backup power supply control method corresponding to the backup power supply control apparatus 800 in the foregoing method embodiments.

Figure 9:
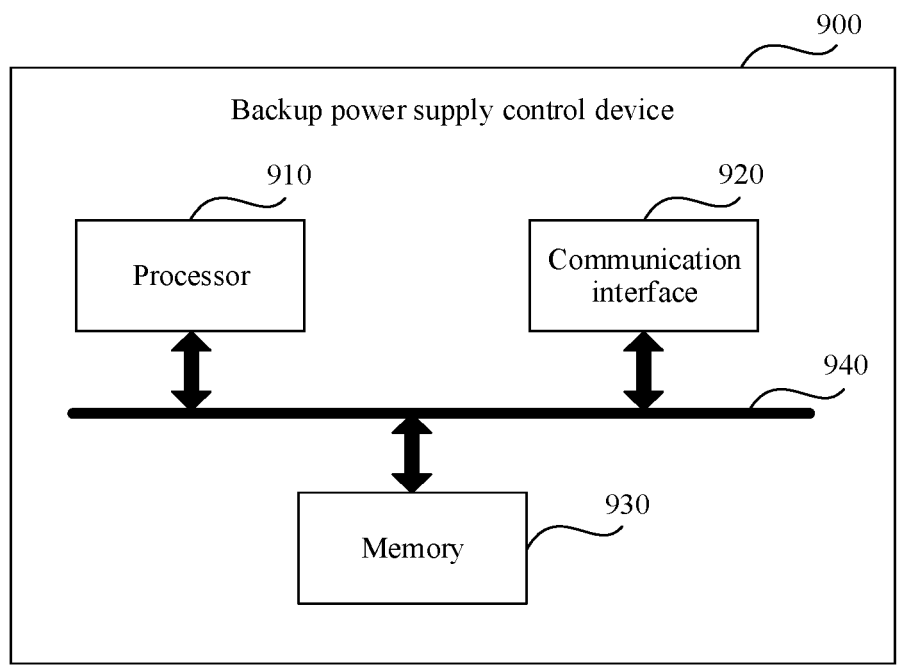
FIG. 9 is a schematic diagram of a structure of a backup power supply control device according to an embodiment of this application.

It should be noted that, hardware structures of the backup power supply control device corresponding to the backup power supply control apparatus 600, the backup power supply control device corresponding to the backup power supply control apparatus 700, and the backup power supply control device corresponding to the backup power supply control apparatus 800 that are provided in the embodiments of this application may all be a structure shown in FIG. 9. FIG. 9 is a schematic diagram of a structure of a backup power supply control device 900 according to an embodiment of this application.

Refer to FIG. 9. The backup power supply control device 900 includes a processor 910, a communication interface 920, and a memory 930. There may be one or more processors 910 in the backup power supply control device 900. One processor is used as an example in FIG. 9. In this embodiment of this application, the processor 910, the communication interface 920, and the memory 930 may be connected by using a bus system or in another manner. In FIG. 9, an example in which the bus system 940 is used for the connection.

The processor 910 may be a central processing unit (CPU), a network processor (NP), or a combination of a CPU and an NP. The processor 910 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 930 may include a volatile memory, for example, a random access memory (RAM). The memory 930 may alternatively include a non-volatile memory, for example, a flash memory, a hard disk drive (HDD), or a solid-state drive (SSD). The memory 930 may further include a combination of the foregoing types of memories.

The memory 930 may store the historical power consumption data and the mains outage data of the communication station that are mentioned in the foregoing embodiments in the memory 930 in a log form.

In one embodiment, the memory 930 stores an operating system and a program, an executable module, or a data structure, or a subset thereof, or an extended set thereof. The program may include various operation instructions, used to implement various operations. The operating system may include various system programs, to implement various basic services and process hardware-based tasks. The processor 910 may read the program in the memory 930, to implement a backup power supply control method provided in the embodiments of this application.

The bus system 940 may be a peripheral component interconnect (PCI) bus, an extended industry standard architecture (EISA) bus, or the like. The bus system 940 may be classified into an address bus, a data bus, a control bus, and the like. For ease of representation, only one thick line is used for representation in FIG. 9, but this does not mean that there is only one bus or only one type of bus.

An embodiment of this application further provides a computer-readable storage medium, including instructions. When the instructions are run on a computer, the computer is enabled to perform the backup power supply control method corresponding to the backup power supply control apparatus 600 in the foregoing method embodiments.

An embodiment of this application further provides a computer-readable storage medium, including instructions. When the instructions are run on a computer, the computer is enabled to perform the backup power supply control method corresponding to the backup power supply control apparatus 700 in the foregoing method embodiments.

An embodiment of this application further provides a computer-readable storage medium, including instructions. When the instructions are run on a computer, the computer is enabled to perform the backup power supply control method corresponding to the backup power supply control apparatus 800 in the foregoing method embodiments.

An embodiment of this application further provides a computer program product including instructions. When the computer program product runs on a computer, the computer is enabled to perform the backup power supply control method corresponding to the backup power supply control apparatus 600 in the foregoing method embodiments.

An embodiment of this application further provides a computer program product including instructions. When the computer program product runs on a computer, the computer is enabled to perform the backup power supply control method corresponding to the backup power supply control apparatus 700 in the foregoing method embodiments.

An embodiment of this application further provides a computer program product including instructions. When the computer program product runs on a computer, the computer is enabled to perform the backup power supply control method corresponding to the backup power supply control apparatus 800 in the foregoing method embodiments.

In this specification, the claims, and the accompanying drawings of this application, terms "first", "second", "third", "fourth", and the like (if existent) are intended to distinguish between similar objects but do not necessarily indicate a specific order or sequence. It should be understood that the data termed in such a way is interchangeable in a proper circumstance, so that the embodiments described herein can be implemented in an order other than the order illustrated or described herein. Moreover, the terms "include", "contain" and any other variant mean to cover non-exclusive inclusion, for example, a process, method, system, product, or device that includes a list of operations or units is not necessarily limited to those operations or units, but may include other operations or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In a plurality of embodiments provided in this application, it should be understood that the disclosed systems, apparatuses, and methods may be implemented in another manner. For example, the described apparatus embodiments are merely examples. For example, the unit division is merely logical service division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical, a mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve objectives of the solutions of the embodiments of this application.

In addition, service units in the embodiments of this application may be integrated into one processing unit, or each of the units may exist alone physically, or two or more units are integrated into one unit. The integrated unit may be implemented in a form of hardware, or may be implemented in a form of a software service unit.

When the integrated unit is implemented in the form of a software service unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes a plurality of instructions for instructing a computer device (which may be a personal computer, a server, or a network device) to perform all or some of the operations of the methods described in the embodiments of this application. The storage medium includes any medium that can store program code, such as a USB flash drive, a removable hard disk drive, a read-only memory (ROM), a random access memory (RAM), a magnetic disk, or an optical disc.

The person skilled in the art should be aware that in the foregoing one or more examples, the services described in the present disclosure may be implemented by using hardware, software, firmware, or any combination thereof. When the services are implemented by software, the services may be stored in a computer-readable medium or transmission of the services may be performed by using the services as one or more instructions or code in the computer-readable medium. The computer-readable medium includes a computer storage medium and a communication medium. The communication medium includes any medium that facilitates transmission of a computer program from one place to another. The storage medium may be any available medium accessible to a general-purpose or dedicated computer.

The objectives, technical solutions, and beneficial effects of the present disclosure have been described in further detail in the foregoing specific implementations. It should be understood that the foregoing descriptions are merely specific implementations of the present disclosure.

The foregoing embodiments are merely intended for describing the technical solutions of this application instead of limiting this application. Although this application is described in detail with reference to the foregoing embodiments, a person of ordinary skill in the art should understand that the person may still make modifications to the technical solutions described in the foregoing embodiments or make equivalent replacements to some technical features thereof, without departing from the scope of the technical solutions of the embodiments of this application.

What is claimed is:

1. A backup power supply control method comprising:
obtaining a target power supplying duration of a battery, and determining an average power consumption of a communication station within a time period corresponding to the target power supplying duration;
obtaining a state of charge of the battery, and determining, based on the state of charge of the battery and the average power consumption, an actual power supplying duration for the battery to supply a power to the communication station; and
in response to the actual power supplying duration being less than the target power supplying duration, adjusting an operation mode of a communication device in the communication station, to reduce the average power consumption, such that the actual power supplying duration for the battery to supply the power to the communication station is enabled to be greater than or equal to the target power supplying duration,
wherein the determining the average power consumption of the communication station within the time period corresponding to the target power supplying duration comprises:
obtaining historical power consumption data of the communication station within a first preset historical time period, and obtaining a current power consumption of the communication station;
determining a total power consumption of the communication station within a first historical time period based on the historical power consumption data, wherein a start point of time of the first historical time period is a first historical point of time, and the first historical time period has a duration equal to the target power supplying duration; and
determining the average power consumption based on the total power consumption and a relationship between a first power consumption and the current power consumption.

2. The method according to claim 1, wherein the determining the average power consumption of the communication station within the time period corresponding to the target power supplying duration further comprises:
matching the current power consumption of the communication station with the historical power consumption data, and determining, based on the historical power consumption data, the first power consumption corresponding to the current power consumption, wherein the first power consumption is a power consumption corresponding to the communication station at the first historical point of time within the first preset historical time period.

3. The method according to claim 1, wherein the obtaining the target power supplying duration of the battery comprises:
obtaining the target power supplying duration entered by a user through a human-computer interaction interface.

4. The method according to claim 1, wherein the obtaining the target power supplying duration of the battery comprises:
obtaining mains outage data of the communication station within a second preset historical time period;
determining, based on the mains outage data, a mains average daily outage duration of the communication station within the second preset historical time period, and determining, based on the mains outage data, a mains maximum daily outage duration of the communication station within the second preset historical time period; and
determining the target power supplying duration based on the mains average daily outage duration and the mains maximum daily outage duration, wherein the target power supplying duration is greater than the average daily outage duration and less than the maximum daily outage duration.

5. The method according to claim 1, wherein the adjusting the operation mode of the communication device in the communication station, to reduce the average power consumption comprises performing at least one of:
controlling the communication device in the communication station to be turned off, or controlling a power of the communication device in the communication station to be reduced.

6. A backup power supply control system comprising:
a first controller configured to:
obtain a target power supplying duration of a battery, and determine an average power consumption of a communication station within a time period corresponding to the target power supplying duration;
obtain a state of charge of the battery, and determine, based on the state of charge of the battery and the average power consumption, an actual power supplying duration for the battery to supply a power to the communication station;
in response to the actual power supplying duration being less than the target power supplying duration, send an energy saving instruction to a second controller; and
the second controller configured to adjust an operation mode of a communication device in the communication station according to the energy saving instruction, to reduce the average power consumption, such that the actual power supplying duration for the battery to supply the power to the communication station is enabled to be greater than or equal to the target power supplying duration,
wherein the first controller is configured to:
obtain historical power consumption data of the communication station within a first preset historical time period, and obtain a current power consumption of the communication station;
determine a total power consumption of the communication station within a first historical time period based on the historical power consumption data, wherein a first historical point of time is a start point of time of the first historical time period, and the first historical time period has a duration equal to the target power supplying duration; and
determine the average power consumption based on the total power consumption and a relationship between a first power consumption and the current power consumption.

7. The system according to claim 6, wherein the first controller is further configured to:
match the current power consumption of the communication station with the historical power consumption data, and determine, based on the historical power consumption data, the first power consumption corresponding to the current power consumption, wherein the first power consumption is a power consumption corresponding to the communication station at the first historical point of time within the first preset historical time period.

8. The system according to claim 6, wherein the first controller is configured to:
obtain the target power supplying duration entered by a user through a human-computer interaction interface.

9. The system according to claim 6, wherein the first controller is configured to:
obtain mains outage data of the communication station within a second preset historical time period;
determine, based on the mains outage data, a mains average daily outage duration of the communication station within the second preset historical time period, and determining, based on the mains outage data, a mains maximum daily outage duration of the communication station within the second preset historical time period; and
determine the target power supplying duration based on the mains average daily outage duration and the mains maximum daily outage duration, wherein the target power supplying duration is greater than the average daily outage duration and less than the maximum daily outage duration.

10. The system according to claim 6, wherein the energy saving instruction carries a target energy saving level; and wherein the second controller is configured to:
determine, based on a predetermined mapping relationship between an energy saving level and an energy saving policy, a target energy saving policy corresponding to the target energy saving level; and
adjust the operation mode of the communication device in the communication station according to the target energy saving policy, to reduce the average power consumption.

11. The system according to claim 6, wherein the second controller is configured to:
control the communication device in the communication station to be turned off, and/or control a power of the communication device in the communication station to be reduced.

12. A backup power supply control apparatus comprising:
a memory and at least one processor, wherein the memory is configured to store a program, and wherein the at least one processor is configured to invoke the program in the memory, wherein the program instructs the at least one processor to:
obtain a target power supplying duration of a battery;
determine an average power consumption of a communication station within a time period corresponding to the target power supplying duration;
obtain a state of charge of the battery;
determine, based on the state of charge of the battery and the average power consumption, an actual power supplying duration for the battery to supply a power to the communication station; and
in response to the actual power supplying duration being less than the target power supplying duration, adjust an operation mode of a communication device in the communication station, to reduce the average power consumption, wherein the actual power supplying duration for the battery to supply the power to the communication station is enabled to be greater than or equal to the target power supplying duration,
wherein the program instructs the at least one processor to:
obtain historical power consumption data of the communication station within a first preset historical time period, and obtain a current power consumption of the communication station;
determine a total power consumption of the communication station within a first historical time period based on the historical power consumption data, wherein a first historical point of time is a start point of time of the first historical time period, and the first historical time period has a duration equal to the target power supplying duration; and
determine the average power consumption based on the total power consumption and a relationship between a first power consumption and the current power consumption.

13. The apparatus according to claim 12, wherein the program further instructs the at least one processor to:
match the current power consumption of the communication station with the historical power consumption data, and determine, based on the historical power consumption data, the first power consumption corresponding to the current power consumption, wherein the first power consumption is a power consumption corresponding to the communication station at the first historical point of time within the first preset historical time period.

14. The apparatus according to claim 12, wherein the program instructs the at least one processor to:
obtain the target power supplying duration entered by a user through a human-computer interaction interface.

15. The apparatus according to claim 12, wherein the program instructs the at least one processor to:
obtain mains outage data of the communication station within a second preset historical time period;
determine, based on the mains outage data, a mains average daily outage duration of the communication station within the second preset historical time period, and determining, based on the mains outage data, a mains maximum daily outage duration of the communication station within the second preset historical time period; and
determine the target power supplying duration based on the mains average daily outage duration and the mains maximum daily outage duration, wherein the target power supplying duration is greater than the average daily outage duration and less than the maximum daily outage duration.

16. The apparatus according to claim 12, wherein the program instructs the at least one processor to:
control the communication device in the communication station to be turned off, and/or control a power of the communication device in the communication station to be reduced.

* * * * *